Patented June 27, 1939

2,163,869

UNITED STATES PATENT OFFICE 2,163,869

MAKING CELLULOSE ETHERS

William R. Collings and Lee De Pree, Midland, Mich., assignors to The Dow Chemical Company, Midland, Mich., a corporation of Michigan No Drawing. Application September 1, 1937, Serial No. 161,967

2 Claims. (Cl. 260—231)

This invention relates to a process for the preparation of cellulose ethers.

It has long been known to react an alkali cellulose with alkyl halides to produce alkyl ethers of cellulose. Considerable attention has been given to the conditions to be employed in the preparation of alkali cellulose and to the most satisfactory type of alkali cellulose for employment in etherification reactions. The alkali cellulose employed in the production of ethers having good film properties and high solubility in organic solvents, has ordinarily been one having an alkali:cellulose ratio between about 1:1 and about 4:1 and a water:cellulose ratio between about 0.3:1 and about 2.0:1. Such alkali cellulose will produce ethers containing between about 2.0 and about 2.75 etherifying substituents per anhydro-glucose unit.

In the etherification step, it has been the practice to employ a large excess of etherifying agent, and to continue the reaction at a temperature ordinarily in the range from about 60° C. to about 150° C. for about 8 to 24 hours, or until the alkali in the alkali cellulose has been completely, or substantially completely, reacted. The amount of alkali required, and hence the amount of etherifying agent needed to form a cellulose ether satisfactory for employment in film-forming and surface-coating compositions, has been far greater than is equivalent to the actual degree of etherification obtained.

It has been discovered that in the etherification of an alkali cellulose, at an early stage of the reaction, i. e. after a period of about 1½ to about 5 hours, the ether derivative which may be isolated from the reaction contains as many substituent groups as that obtained after a much longer reaction. That is to say, after a relatively short reaction period the continued contact between alkali cellulose and etherifying agent at reaction temperatures results principally in the formation of by-products such as alkyl ethers and alcohols, and in a corresponding conversion of alkali and etherifying agent to products other than cellulose ethers. Following this discovery it was proposed to effect greater economy in reagents by stopping the etherification reaction after a relatively short reaction time corresponding to the point at which the maximum amount of etherification possible from the particular alkali cellulose was first obtained. It was found, however, that the product isolated after such a short reaction period is not homogeneous, has poor solubility in organic solvents and is unsuited to the preparation of lacquers and similar coating compositions. To convert such a non-uniform product to a form satisfactory for use in film-forming and surface-coating compositions requires further chemical treatment, e. g. with organic or inorganic acids. Such treatments, while improving the solubility characteristics of the cellulose ether, also exert a degrading and hydrolyzing effect thereon. It is well known that cellulose ethers which have been degraded by the action of acids do not produce as stable films as those which have not been subjected to such treatment.

Cellulose ether products resulting from the type of etherification reaction, in which all of the alkali present has reacted with the etherifying agent, form clear solutions in organic solvents and apparently produce more satisfactory films than can be obtained from the reaction product isolated at that relatively early stage in the reaction, where the desired number of substituent groups is first found to have reacted with the cellulose molecule. When, however, all of the alkali has reacted with the etherifying agent, the ether product obtained yields brittle films, which are not stable when subjected to moderately elevated temperatures. For example, the viscosity of a standard solution of such an ethyl cellulose which has been subjected to a temperature of about 120° C. for 16 hours, may be as much as 30 to 50 per cent lower than that of the same ethyl cellulose prior to heat treatment. This lack of stability is considered conclusive evidence of the unsuitability of the products isolated after complete neutralization of the alkali for application in many commercial processes.

An object of this invention is to provide a process for the preparation of cellulose ethers by the interaction of alkali cellulose and an alkyl halide, whereby stable gel-free cellulose ethers satisfactory for employment in film-forming and surface-coating compositions may be produced.

We have now found that the foregoing object can be attained by carrying out the etherification of alkali cellulose at a temperature between 60° and 150° C., in the presence of a large excess of an alkyl halide and continuing the reaction until at least about 80 per cent of the alkali originally present in the alkali cellulose has reacted. This is considerably beyond the point at which the maximum degree of etherification is first obtained. The alkyl halide may, if desired, be mixed with an inert liquid, such as benzene, for use in the process. The process is applicable primarily to the production of cellulose ethers from alkali cellulose having an alkali:cellulose ratio between about 1:1 and about 4:1 and a water:cellulose ratio between about 0.3:1 and about 2:1. While we have ordinarily discontinued the etherification when about 95 per cent of the alkali originally present had been neutralized, we have found that this step may be continued until the pH of the reaction mixture has been reduced to about 8. No appreciable advantage is derived from continuing the etherification until more than about 95 per cent of the alkali has reacted and certain definite disadvantages accrue to a process wherein the reaction is allowed to progress to a pH value of less than about 8 in the reaction mixture. In a majority of cases the cellulose ether produced has as good film forming properties and as high solubility in organic solvents when about 80 to 90 per cent of the alkali originally present has reacted as can be obtained under any known conditions of reaction between such an alkali cellulose and etherifying agent.

In addition to the economy which can be effected in reagents, i. e. sodium hydroxide and alkyl halide, by discontinuing the etherification after only 80 to 95 per cent of the alkali has reacted, a further advantage accrues to our new process. The etherification of cellulose is accompanied by the production of water. Alkyl halides have a tendency to hydrolyze in the presence of water, forming hydrohalic acids. Such acids cannot exert any degrading effect upon the cellulose ethers so long as there is present in the reaction mixture sufficient alkali to effect their neutralization as soon as they are formed. If, however, heating is continued after the alkali has all been reacted, the reaction mixture becomes acid and the cellulose ethers recoverable therefrom will be more brittle and less stable than those produced according to our process.

The following examples illustrate the practice of our invention:

*Example 1*

245 pounds of alkali cellulose containing 71.5 pounds of cellulose, 134 pounds of sodium hydroxide and 39.5 pounds of water was treated with ethyl chloride, in an amount equivalent to between 8 and 10 times the weight of cellulose present, in a closed reactor heated to a temperature of about 115° C. Samples were withdrawn periodically from the etherification vessel and analyzed to determine the amount of alkali consumed, the extent of etherification and the solubility of the ethyl cellulose. The results are given in the following table.

*Table I*

| Hours at 115° C. | Percent sodium hydroxide converted | Ethyl cellulose properties | |
|---|---|---|---|
| | | Percent ethoxyl | Percent insoluble in alcohol: benzene |
| 1.5 | 34.2 | 24.3 | 28.00 |
| 3 | 64.6 | 43.0 | 25.00 |
| 3.5 | 69.7 | 45.7 | 17.00 |
| 5 | 83.7 | | 2.50 |
| 6 | 92.0 | 46.7 | 0.35 |
| 7 | 97.3 | | 0.20 |
| 9 | 99.8 | 47.0 | 0.20 |
| 10 | 99.9 | 47.0 | 0.20 |
| 12 | 100.0 | 47.2 | 0.20 |

It is observed that when between about 84 and about 92 per cent of the amount of alkali originally present had been converted to sodium chloride in the etherification reaction, the amount of insoluble material in the product reached a value below which it was not substantially reduced by further reaction. That is, when between about 84 and about 92 per cent of the alkali had reacted, the product was as satisfactory for most purposes as that obtained by continuing the reaction until all of the alkali had been neutralized. Had the reaction been stopped after about 92 per cent of the alkali had reacted, there would have been recovered an amount of alkali equal to 8 per cent of that originally present, and an additional amount of recoverable ethyl chloride equivalent to the remaining alkali. Tests indicated that the tensile strength and elongation of ethyl cellulose films prepared from the product removed from the reactor when about 92 per cent of the alkali had reacted, slightly exceeded the corresponding values determined on the product obtained after complete neutralization of the alkali.

*Example 2*

An alkali cellulose wherein the alkali:cellulose ratio was 2.32:1 and the water:cellulose ratio was 0.66:1 was reacted with a large excess of ethyl chloride at 120° C. Samples removed from the reactor at frequent intervals were tested for their solubility in a mixture of 80 parts of benzene and 20 parts of ethanol, by volume. As shown in the following table, the solubility of the product did not improve after about 82 per cent of the alkali originally present had entered into reaction. As stated in the foregoing example, tensile strength and elongation measurements indicated the product obtained when about 82 per cent of the alkali had reacted was as good for most applications as that obtained after more of the alkali had reacted.

*Table II*

| Hours at 120° C. | Percent sodium hydroxide converted | Ethyl cellulose properties | |
|---|---|---|---|
| | | Percent ethoxyl | Percent insoluble in alcohol: benzene |
| 6 | 70 | 47.4 | 0.20 |
| 7 | 82 | | 0.01 |
| 8 | 90 | 48.4 | 0.01 |

In the foregoing examples the product isolated after the amount of alkali converted to sodium chloride was between about 80 and about 95 per cent of that originally present was found to be as soluble, to have as great a tensile strength, and to be as capable of elongation as the product isolated after more of the alkali had been consumed. It is possible, therefore, to effect an economy in the amount of alkali converted to sodium chloride during the reaction to the extent of between about 5 and about 20 per cent of that ordinarily employed. This amount of alkali can be recovered by leaching from the reaction mixture after the most soluble ether has been formed. A corresponding economy in etherifying agent is made possible by discontinuing the reaction after between about 80 and about 95 per cent of the alkali originally present has been neutralized.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. In a single stage etherification of alkali cellulose containing between about 1 and about 4 parts of alkali and correspondingly between about 0.3 and about 2 parts of water per part of cellulose by weight, the method which consists in heating the said alkali cellulose with at least 8 parts by weight of a lower alkyl halide per part of cellulose present, at a reaction temperature between about 60° and about 150° C., only until between about 80 and about 95 per cent of the alkali present has been neutralized by reaction with the said alkyl halide, discontinuing the reaction before the pH of the reaction mixture has been reduced below about 8, and recovering the so-produced lower alkyl ether of cellulose containing between 2.0 and about 2.75 alkyl groups per anhydro-glucose unit, said ether being characterized by its ability to deposit from solution stronger, more flexible and more stable films than do similar ethers prepared under reaction conditions such that the alkyl halide is not in excess over the alkali present and such that the alkali is substantially neutralized.

2. In a single stage etherification of alkali cellulose containing between about 1 and about 4 parts of alkali and correspondingly between about 0.3 and about 2 parts of water per part of cellulose by weight, the method which consists in heating the said alkali cellulose with at least 8 parts by weight of ethyl chloride per part of cellulose present, at a reaction temperature between about 60° and about 150° C., only until between about 80 and about 95 per cent of the alkali present has been neutralized by reaction with the said ethyl chloride, discontinuing the reaction before the pH of the reaction mixture has been reduced below about 8, and recovering the so-produced ethyl cellulose containing between 2.0 and about 2.75 ethyl groups per anhydro-glucose unit, said ethyl cellulose being characterized by its ability to deposit from solution stronger, more flexible and more stable films than does a similar ethyl cellulose prepared under reaction conditions such that the ethyl chloride is not in excess over the alkali present and such that the alkali is substantially neutralized.

WILLIAM R. COLLINGS.
LEE DE PREE.